C. D. COLLEY.
LINER FOR TRANSMISSION AND BRAKE BANDS.
APPLICATION FILED JUNE 6, 1916.
1,274,686.
Patented Aug. 6, 1918.
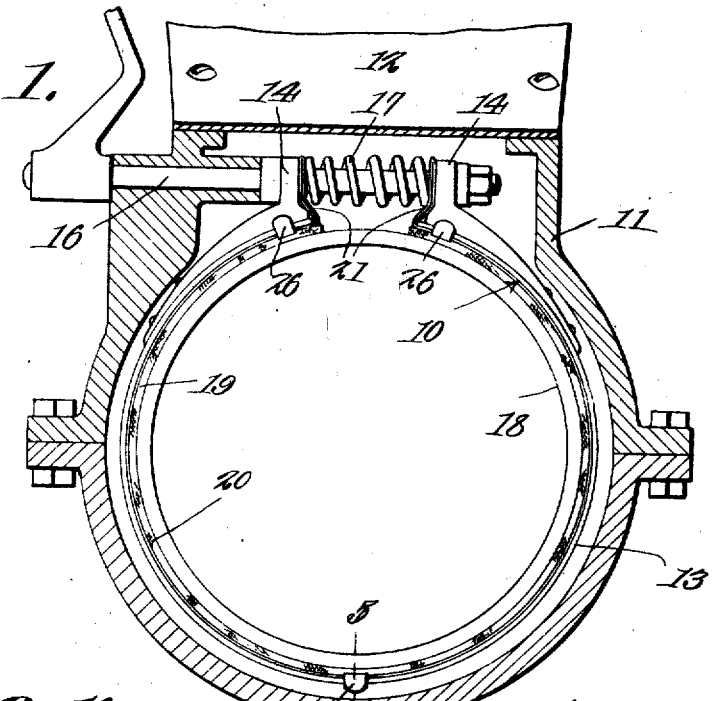
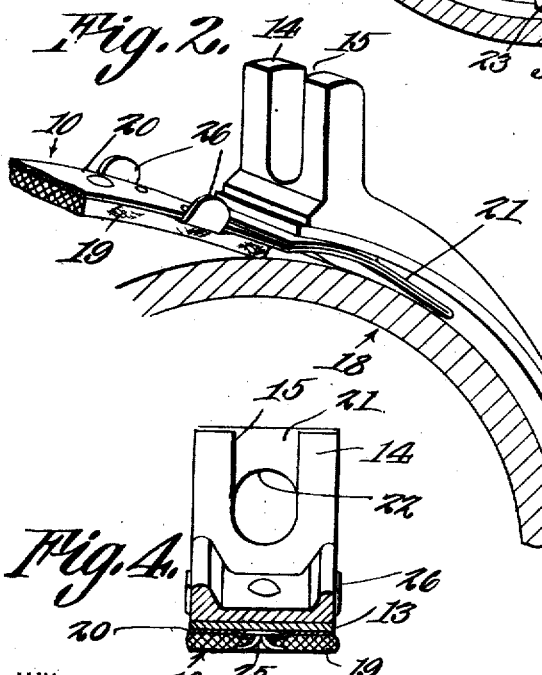
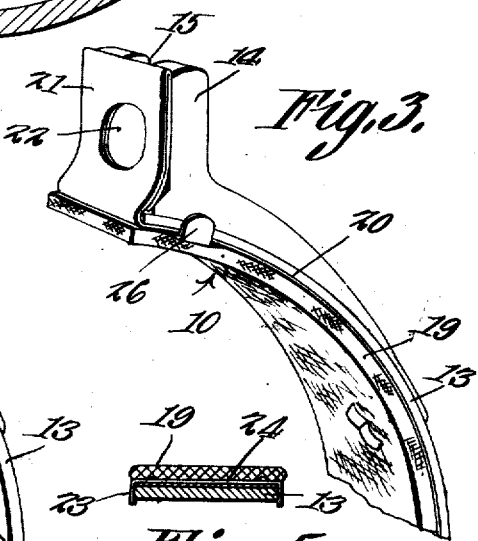
Witnesses
C. D. Colley
Inventor,
by
Attorneys.

UNITED STATES PATENT OFFICE.

CLAYTON D. COLLEY, OF NARROWS, VIRGINIA.

LINER FOR TRANSMISSION AND BRAKE BANDS.

1,274,686.  Specification of Letters Patent.  Patented Aug. 6, 1918.

Application filed June 6, 1916. Serial No. 102,008.

*To all whom it may concern:*

Be it known that I, CLAYTON D. COLLEY, a citizen of the United States, residing at Narrows, in the county of Giles and State of Virginia, have invented a new and useful Liner for Transmission and Brake Bands, of which the following is a specification.

The object of the invention is to provide a simple and inexpensive substitute liner for transmission and brake bands, readily attachable without machine work, and particularly applicable to those types of transmission mechanisms found in the Ford and similar machines.

In devising this liner which embodies the essential principles of a device covered by a copending application No. 65,982 filed December 9, 1915, it has been the object to construct a device of this character wherein longitudinal and transverse displacement may be prevented without depending upon any feature of the ordinary transmission or brake band which is not ordinarily found in said devices, or in other words to utilize those features which are common to transmission and brake bands as the means for anchoring the liner to prevent longitudinal creeping and transverse displacement, so that a substitute liner may be positioned while on the road and without taking down the transmission mechanism.

A further object in view has been to facilitate the threading of the liner into place through the opening usually found in the housing of the transmission and brake band.

Further objects and advantages of the invention will appear in the following description, it being understood that various changes in the form, proportions and minor details of construction may be resorted to within the scope of the claims, without departing from the spirit of the invention.

In the accompanying drawings:—

Figure 1 is a sectional view of a transmission casing or housing showing therein the liner embodying a preferred form of this invention arranged in operative relation with the transmission band.

Fig. 2 is a detail perspective view showing one end of the liner with the parts thereof in the position which they occupy in commencing to thread the same into place within the band of the transmission or brake.

Fig. 3 is a similar view showing one end of the band and liner in their proper relative positions as also indicated in Fig. 1.

Fig. 4 is a detail transverse sectional view of a liner and band showing the means for attaching the liner facing to the backing strap.

Fig. 5 is a detail transverse sectional view on the plane indicated by the line 5—5 of Fig. 1, to show the preferred means for attaching the lugs to prevent transverse displacement.

In order to illustrate the proper position of the liner 10 forming the subject matter of the invention, there is illustrated in Fig. 1 a housing or casing 11 having the removable cap or plate 12, the removal of which gives access to the interior of the housing, a transmission or brake band 13 of any of the ordinary and well known constructions having the terminal lugs 14 which as shown in Figs. 2 and 3 may be slotted as at 15 for engagement by the rock shaft or spindle 16 of the band actuating mechanism. Obviously this mechanism may be of any preferred construction, but in that illustrated the rocker shaft or spindle 16 is extended through the openings in the lugs 14 and a spring 17 is interposed between said lugs to yieldingly hold them separated. The operation of the member 16 by suitable mechanism serves to draw said lugs toward each other and thereby cause engagement of the band with the drum or equivalent member 18 through the agency of the interposed liner.

The liner consists of a friction member or body portion comprising an inner friction facing 19 and a pliable, preferably metallic backing strap 20, and is adapted to be threaded between the band 13 and the drum 18 (or other element of the mechanism) by inserting one end of said liner as indicated in Fig. 2 and advancing the same until it has passed entirely around to the position indicated in Fig. 1. In order that the liner may be guided and introduced with facility, it is provided at one or both ends with a leader, which in the construction illustrated consists of an ear formed as an extension or prolongation of the backing strap 20, said projecting portion being reinforced or doubled back upon itself to give it increased strength while not detracting from the pliability thereof. When furnished to the consumer the leader or ear 21 may be arranged in substantial alinement with the body portion of the friction member as shown in Fig. 2 (either one or both extremities being thus disposed) and after the liner has been introduced to the proper position, said leader or ear is bent outward as shown in Fig. 3 and also in Fig. 1 to occupy a position in engagement and practically in contact with the inner face of the band lug. Preferably both extremities of the liner are constructed as above described so that when the leaders or ears are bent outward, as shown in Fig. 1, they occupy positions substantially in contact with the proximate faces of said band lugs and said leaders or ears are preferably apertured as shown at 22 for registration with the openings 15 in the band lugs, to permit the spindle or pin 16 to extend therethrough. In this way the liner is substantially locked to the band, and the engagement of the same with the faces of the lugs effectually prevents longitudinal displacement or creeping of the liner with reference to the band.

To prevent transverse or lateral displacement of the liner with reference to the band, lateral lugs 23 may be provided, and in the preferred construction these lugs are formed by and consist of the extremities of a thin plate 24 riveted or otherwise firmly secured to the backing strap of the liner. This feature of construction is designed to economize material of the backing strap. The friction facing of the liner may be secured to the backing strap by any suitable means such as the fasteners 25 illustrated in detail in Fig. 4. As an additional means of preventing lateral displacement of the liner, but primarily as a means of assisting in the guiding of the liner to its place, see Fig. 2, lugs 26, similar to the lugs 23 may be employed near the pliable extremities constituting the ears of the friction member of the liner. These guide lugs obviously engage the opposite edges of the band 13 as the leader is inserted between said band and the drum, and by traveling in contact with said edges, serve to facilitate the proper disposition of the liner.

It will be obvious moreover that the removal of a liner to permit of the substitution of another can be accomplished simply by disengaging the member 16 of the band actuating means from the apertured terminal ears of the liner, and pulling the same longitudinally from the interior of the band through the space between the band lugs and thence through the opening in the housing which normally is closed by the cap or cover 12. It will be noted that there are no supplemental fastening means employed in connection with the liner as described and illustrated, the proper anchoring or securing of the same being effected without any modification of the ordinary brake or transmission band construction, and merely by utilizing features which ordinarily form parts of said construction.

What is claimed is:—

1. As an article of manufacture, a liner for the purpose described, having a pliable backing strap carrying a friction facing, and terminally bendable to occupy radial positions and provided with intermediate lugs projecting radially from the side edges of the backing.

2. As an article of manufacture, a liner for the purpose described, having a pliable backing strap carrying a friction facing, and terminally bendable to occupy radial positions, and a plate secured to the backing at an intermediate point and provided with outturned extremities forming lugs at the side edges of the backing.

3. As an article of manufacture, a liner for the purpose described, having a pliable backing strap carrying a friction facing, and terminally bendable to occupy radial positions, and radially disposed terminal and intermediate lugs projecting from the side edges of said backing strap and serving to guide and prevent lateral displacement of the liner.

4. The combination with a friction band and operating means therefor, of a lining longitudinally insertible along the inner surface of the friction band, means provided on said lining for slidably engaging the edges of the friction band, and additional means including angularly disposed ends of the lining supported by the aforesaid operating means for holding the lining to the band.

In testimony that I claim the foregoing as my own, I have hereto affixed my signature in the presence of two witnesses.

CLAYTON D. COLLEY.

Witnesses:
 IVY E SIMPSON,
 PHILOMENA A. ROCKELLI.